United States Patent
Jeon et al.

(10) Patent No.: US 7,909,475 B2
(45) Date of Patent: Mar. 22, 2011

(54) APPARATUS FOR ROTATING LAMP SET

(75) Inventors: Sang-Woo Jeon, Gyeongsan (KR);
Young-Ho Son, Gyeongsan (KR)

(73) Assignees: SL Seobong, Cheonan (KR); SL Lighting, Daegu (KR)

( * ) Notice: Subject to any disclaimer, the term of this patent is extended or adjusted under 35 U.S.C. 154(b) by 246 days.

(21) Appl. No.: 12/266,684

(22) Filed: Nov. 7, 2008

(65) Prior Publication Data

US 2009/0116213 A1    May 7, 2009

(30) Foreign Application Priority Data

Nov. 7, 2007    (KR) .................. 10-2007-0113342

(51) Int. Cl.
*F21V 21/30* (2006.01)

(52) U.S. Cl. .......... 362/35; 362/272; 362/273; 362/286; 362/386; 362/428; 362/513; 362/526; 362/528

(58) Field of Classification Search .................... 362/35, 362/272, 273, 286, 289, 307, 386, 421, 428, 362/513, 515, 524, 526, 528
See application file for complete search history.

(56) References Cited

U.S. PATENT DOCUMENTS

| 6,478,457 | B1 | 11/2002 | Manley |
| 6,641,292 | B2 * | 11/2003 | Miki et al. .................. 362/513 |
| 7,183,938 | B2 * | 2/2007 | McKendry et al. .......... 362/35 |

FOREIGN PATENT DOCUMENTS

JP    06-176604    6/1994

* cited by examiner

*Primary Examiner* — Stephen F Husar
(74) *Attorney, Agent, or Firm* — Edwards Angell Palmer & Dodge LLP; Kongsik Kim

(57) ABSTRACT

An apparatus for rotating a lamp set is provided. The apparatus includes: a motor; a shaft which is rotatable by the motor and includes screw threads formed thereon; a sliding unit which includes a hole having screw threads formed therein that are engaged with the screw threads of the shaft and an insertion ball, the sliding unit being movable along the shaft upon rotation of the shaft; and a holder unit which includes a groove, the insertion ball being inserted into the groove.

8 Claims, 12 Drawing Sheets

APPARATUS FOR ROTATING LAMP SET

CROSS-REFERENCE TO RELATED APPLICATION

This application claims priority from Korean Patent Application No. 10-2007-0113342 filed on Nov. 7, 2007, the disclosure of which is incorporated herein by reference in its entirety.

BACKGROUND

1. Technical Field

The present invention relates to an apparatus for rotating a lamp set, and more particularly, to an apparatus for horizontally rotating a lamp set.

2. Related Art

A headlamp for a vehicle is a lamp used to illuminate the road ahead of the vehicle.

Conventional headlamps for vehicles are designed to illuminate only the road ahead regardless of driving circumstances such as the shape of a road.

That is, the steering angle of conventional headlamps is generally fixed so as to illuminate only the road ahead even when drivers make a left turn or a right turn, and thus, the visibility of drivers may be restricted. Therefore, it is almost impossible for drivers to anticipate emergencies while driving and readily take appropriate actions to avoid such emergencies. As a result, the likelihood of traffic accidents may increase.

Accordingly, there is a need for a headlamp that can improve the visibility of drivers according to the direction of movement of a steering wheel and thereby prevent traffic accidents.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Apparatuses for rotating a lamp set are provided, which can dynamically change the steering direction of a lamp set by horizontally rotating the lamp set according to the driving circumstances.

According to an aspect of the present invention, there is provided an apparatus for rotating a lamp set, the apparatus including: a motor; a shaft which is rotated by the motor and includes screw threads formed thereon; a sliding unit which includes a hole having screw threads formed therein and an insertion ball and is able to move along the shaft when the shaft is inserted into the sliding unit; and a holder unit which includes a groove formed as a dome, the insertion ball being inserted into the groove.

The aspects, features and advantages of the present invention are not restricted to the one set forth herein. The above and other aspects, features and advantages of the present invention will become more apparent to one of ordinary skill in the art to which the present invention pertains by referencing a detailed description of the present invention given below.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF THE EXEMPLARY EMBODIMENTS

Figure 1:
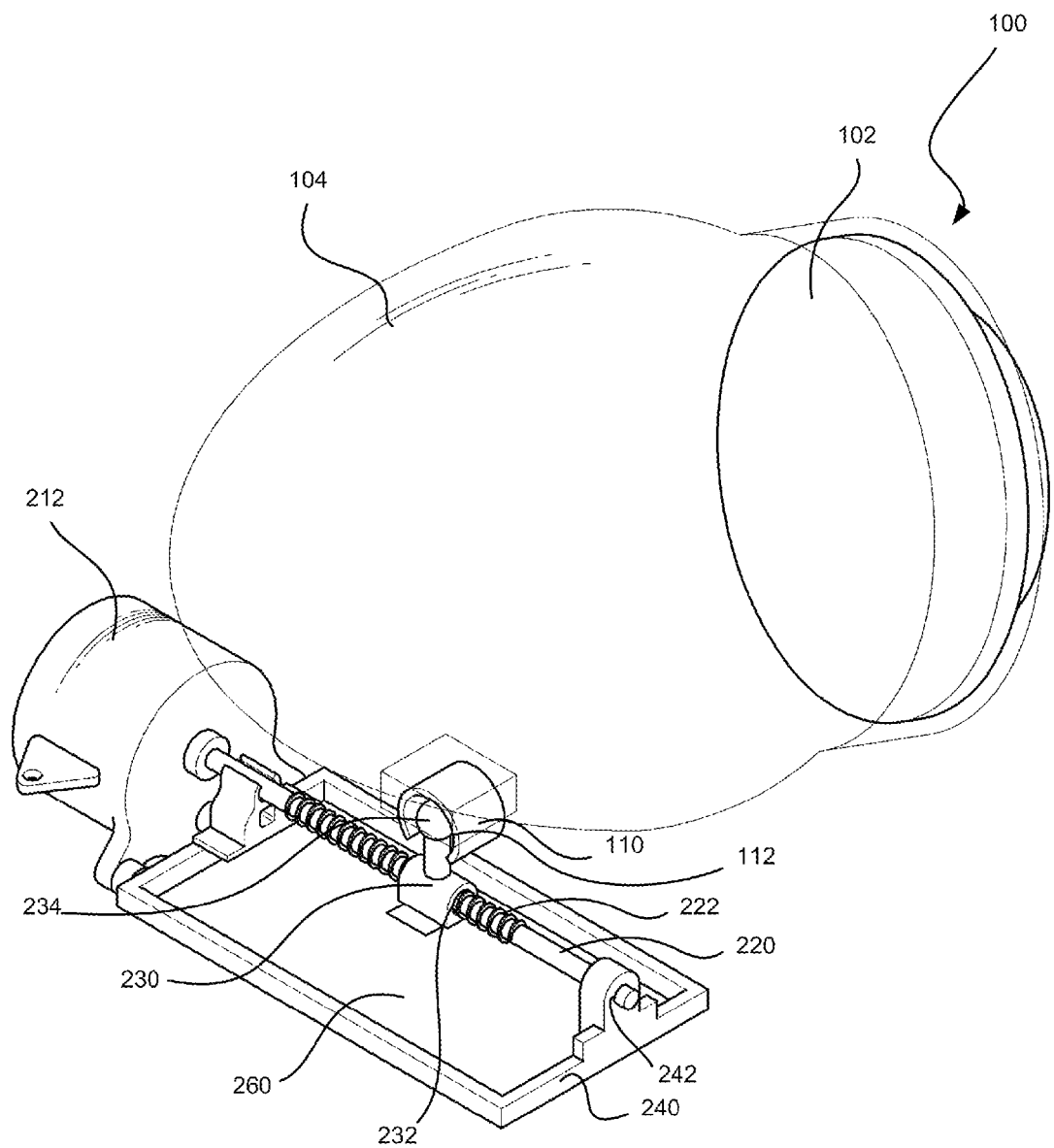
FIG. 1 illustrates a perspective view of a lamp set with an apparatus for rotating the lamp set according to a first embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. Like reference numerals in the drawings denote like elements, and thus their description will be omitted.

Figure 2:
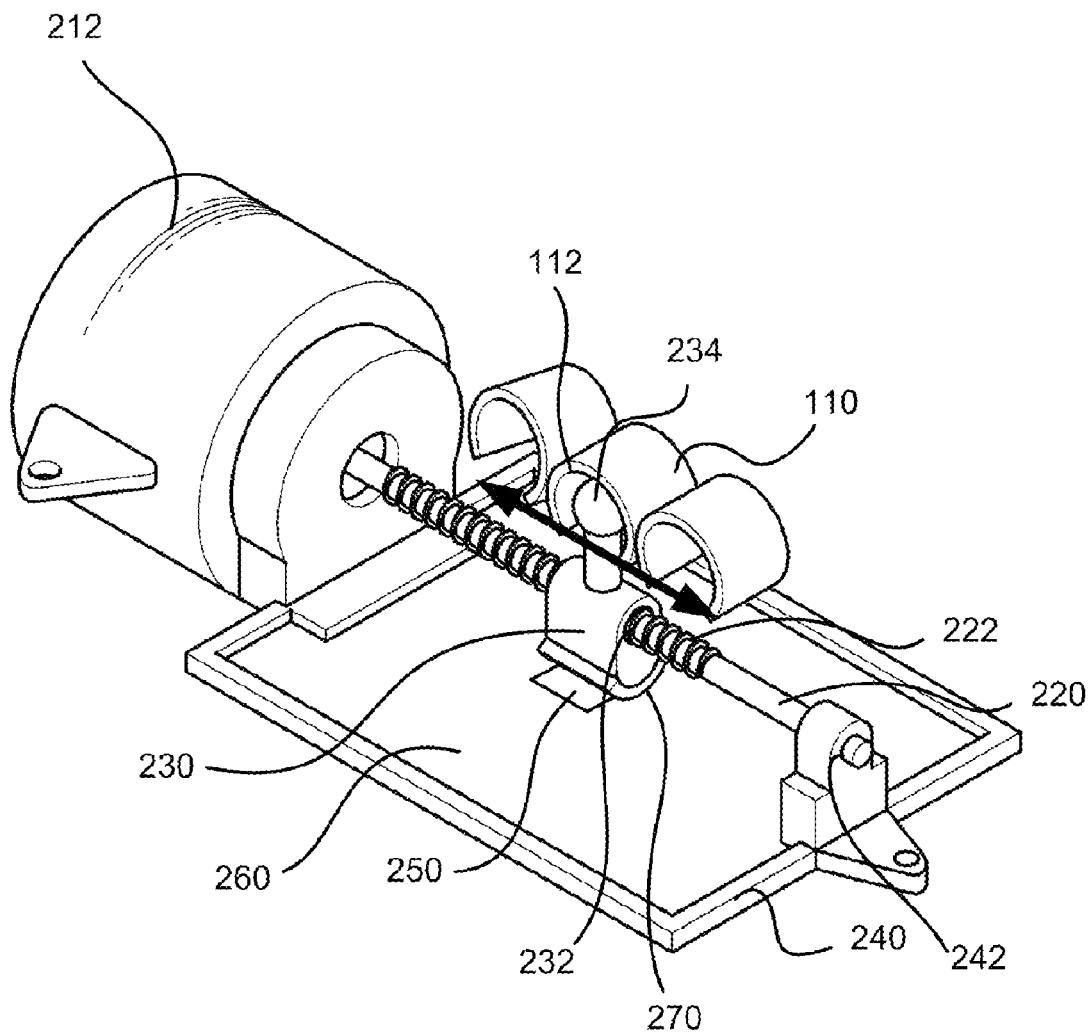
FIG. 2 illustrates a perspective view of the apparatus according to a first exemplary embodiment of the present invention.
Figure 3:
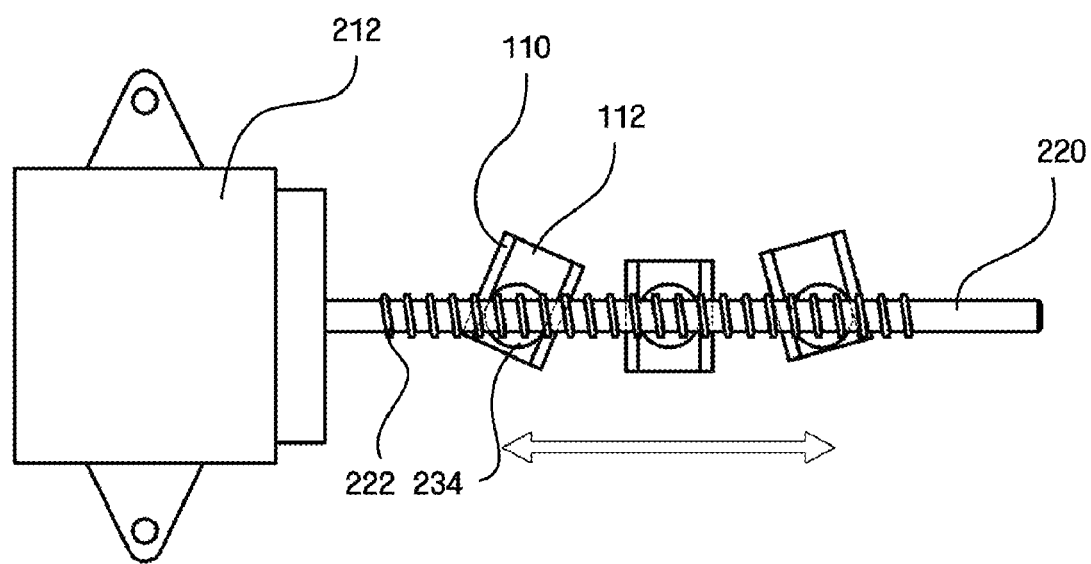
FIG. 3 is a diagram showing how a lamp set can be rotated by the rotation of a sliding unit and a holder unit of the apparatus shown in FIG. 2.

FIG. 1 illustrates a perspective view of a lamp set 100, FIG. 2 illustrates a perspective view of an apparatus for rotating the lamp set according to a first exemplary embodiment of the present invention, and FIG. 3 is a diagram showing how the lamp set can be rotated by the rotation of a sliding unit 230 and a holder unit 110 of the apparatus shown in FIG. 2.

The apparatus may include a motor (not shown), a shaft 220, the sliding unit 230, and the holder unit 110 formed at the lamp set 100. The lamp set 100 may also include a frame unit 240.

The lamp set 100 may be implemented as various forms. For example, it may be implemented as a projection lamp set capable of realizing various beam patterns or as a clear lamp set realizing a single beam pattern. The lamp set 100 may be an assembly including a head lamp (not shown) generating light, a front lens 102, and a lamp housing 104.

The holder unit 110 is disposed at a lower portion of the lamp set 100. A groove 112 is formed in the holder unit 110 so that an insertion ball 234 of the sliding unit 230 can be inserted into the holder unit 110. The groove 112 may have various shapes. For instance, it may be formed as a semicircular cylinder or a hemisphere. The holder unit 110 may be formed in one body with the housing 104 of the lamp set 100. Alternatively, the holder unit 110 may be fabricated separately from the lamp set 100 and may then be coupled to the lamp set 100.

The motor rotates the shaft 220. Screw threads 222 are formed on the circumferential surface of the shaft 220. The shaft 220 is inserted into the sliding unit 230. Thus, the sliding unit 230 rectilinearly moves along the shaft 220 upon the rotation of the shaft 220. One end of the shaft 220 is inserted into a groove or hole 242 of the frame unit 240 and is thus fixed.

The sliding unit 230 has a hole 232 formed therein such that the shaft 220 may be inserted into the sliding unit 230 through the hole 232. Screw threads are also formed in the hole 232 so that the sliding unit 230 can smoothly move along the shaft 220 upon the rotation of the shaft 220. The insertion ball 234 is disposed at an upper portion of the sliding unit 230. The insertion ball 234 is formed as a sphere. The insertion ball 234 may be inserted into the groove 112 of the holder unit 110 of the lamp set 100.

Referring to FIG. 3, the sliding unit 230 rectilinearly moves along the shaft 220 upon the rotation of the shaft 220. Then, the insertion ball 234 in the holder unit 110 applies pressure to the holder unit 110, and thus, the lamp set 100 rotates horizontally. More specifically, the insertion ball 234 may slightly move inside the groove 112 of the holder unit 110 and may thus rotate the holder unit 110 within a predetermined angle range while slightly moving from one place to another within the groove 112. If the sliding unit 230 moves to the left, the holder unit 110 may rotate to the right. On the other hand, if the sliding unit 230 moves to the right, the holder unit 110 may rotate to the left.

Referring to FIG. 2, the frame unit 240 fixes a substrate 260. The substrate 260 includes a magnetic sensor 250. The magnetic sensor 250 is formed as a rectangle, is disposed below the sliding unit 230 and detects the position of the sliding unit 230. The frame unit 240 may include the groove or hole 242. The position of the shaft 220 may be fixed by insertion of the shaft 220 into the groove or hole 242.

A magnet 270 is fixed to the bottom of the sliding unit 230. The magnetic sensor 250, which is fixed onto the substrate 260 under the sliding unit 230, may sense the magnet 270 and may thus detect the relative position of the sliding unit 230 to the shaft 220. Once the position of the sliding unit 230 is detected, the rotation angle of the lamp set 100, which is rotated by the sliding unit 230, may be determined. The magnetic sensor 250 may be disposed directly below the shaft 220. More specifically, when the lamp set 100 faces forward, the magnetic sensor 250 may be disposed directly below the sliding unit 230 and may thus be able to sense the magnet 270 directly below the sliding unit 230.

In modified embodiments, the apparatus may further include one or more guide units. The guide unit may be disposed along the path of movement of the sliding unit 230, thereby preventing the sliding unit 230 from rotating due to the friction between the sliding unit 230 and the shaft 220. The guide unit may be placed in contact with the sliding unit 230 and may thus be able to properly guide the sliding unit 230.

Apparatuses for rotating a lamp set according to other exemplary embodiments of the present invention, which include one or more guide units, will hereinafter be described in detail.

Figure 4:
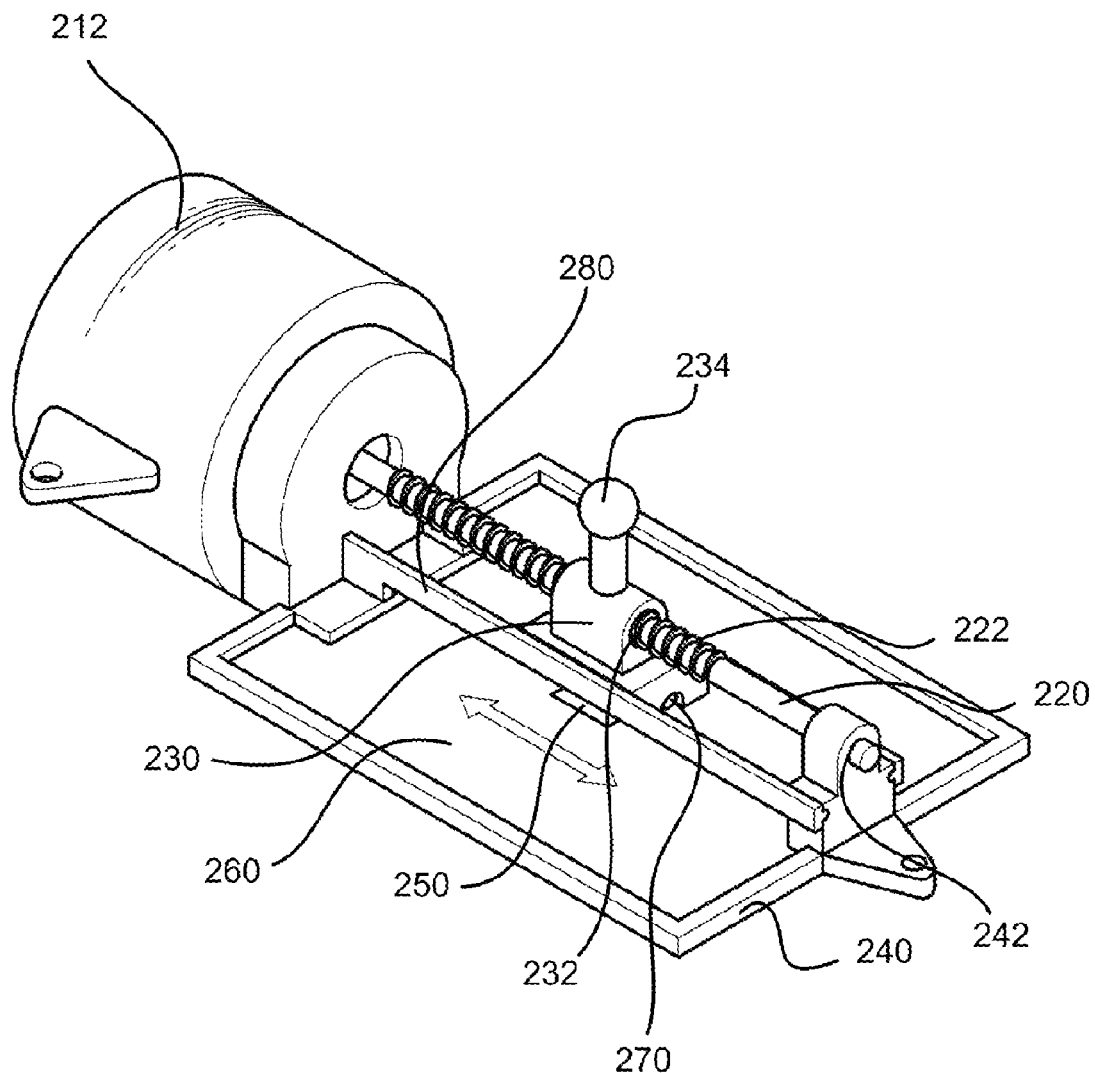
FIG. 4 illustrates a perspective view of an apparatus for rotating a lamp set according to a second exemplary embodiment of the present invention.
Figure 5:
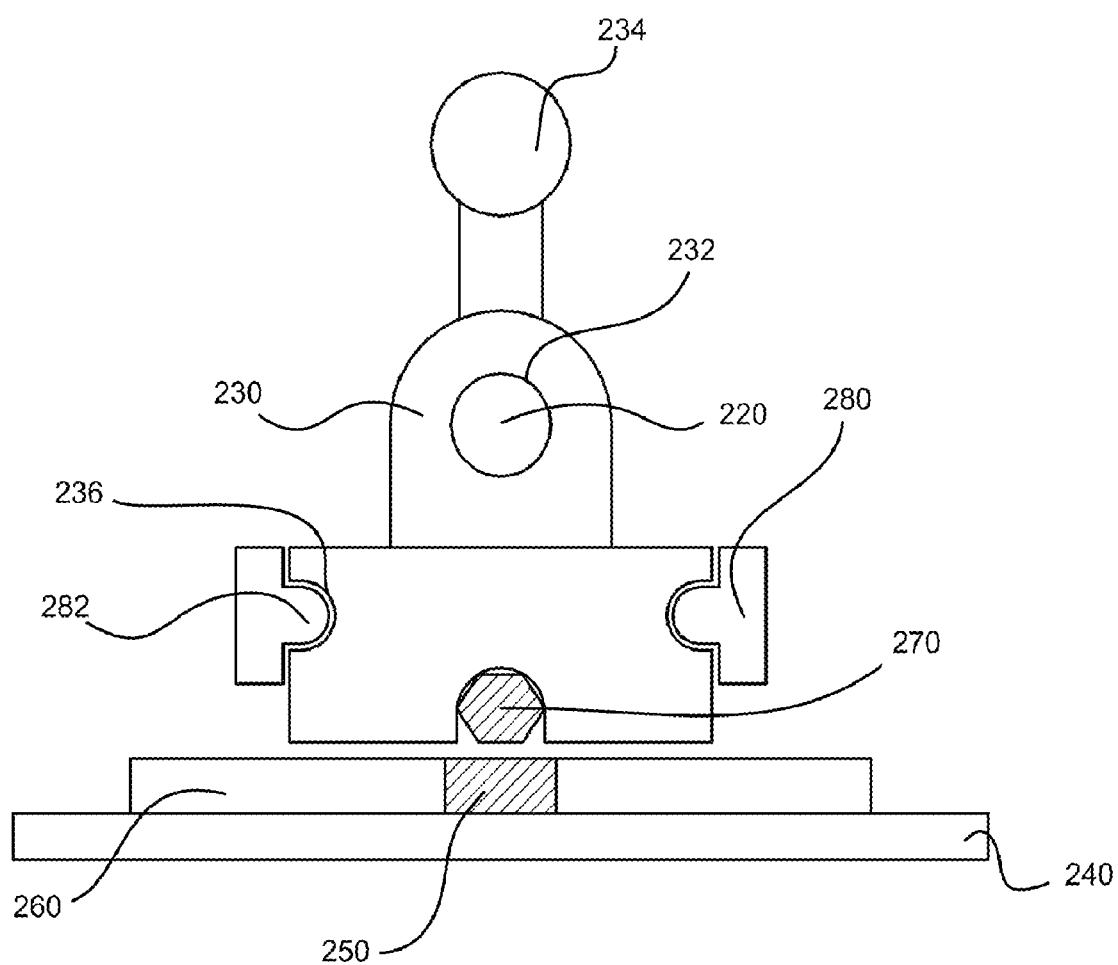
FIG. 5 illustrates a cross-sectional view of the sliding unit of the apparatus shown in FIG. 4.

FIG. 4 illustrates a perspective view of an apparatus for rotating a lamp set according to a second exemplary embodiment of the present invention, and FIG. 5 illustrates a cross-sectional view of the sliding unit 230 of the apparatus shown in FIG. 4. The exemplary embodiment of FIGS. 4 and 5 will hereinafter be described, mainly focusing on differences from the exemplary embodiment of FIGS. 2 and 3.

The apparatus according to the exemplary embodiment of FIGS. 4 and 5, unlike the apparatus according to the exemplary embodiment of FIGS. 2 and 3, may include a pair of guide units 280. In addition, the shape of the sliding unit 230 of the apparatus according to the exemplary embodiment of FIGS. 4 and 5 is different from the shape of the sliding unit 230 of the apparatus according to the exemplary embodiment of FIGS. 2 and 3.

Referring to FIGS. 4 and 5, the guide units 280 may be disposed along the path of movement of the sliding unit 230. More specifically, the guide units 280 may extend from a motor case 212, which covers a motor (not shown), to a frame unit 240 in parallel with a shaft 220. For instance, one of the guide units 280 is disposed on one side of the path of movement of the sliding unit 230 and the other of the guide units 280 is disposed on the other side of the path of movement of the sliding unit 230. The motor case 212 may be formed in a single body with the guide units 280 and the frame unit 240, as illustrated in FIG. 4, or formed separately. Referring to FIG. 5, each of the guide units 280 may include a protrusion 282, which is formed on an inner lateral surface of a corresponding guide unit 280 and faces the sliding unit 230.

The sliding unit 230 may include a pair of grooves 236, which are formed on either lateral surfaces of the sliding unit 230 and face the guide units 280. The protrusions 282 of the guide units 280 may be inserted into the grooves 236 of the sliding unit 230. Thus, the movement of the sliding unit 230 may be guided by the guide units 280, and the sliding unit 320 may be prevented from rotating about the shaft 220 due to the friction between the sliding unit 230 and the shaft 220.

Alternatively, each of the guide units 280 may include a groove, and the sliding unit 230 may include a pair of protrusions. In this case, the protrusions of the sliding unit 230 may be inserted into the grooves of the guide units 230.

Figure 6:
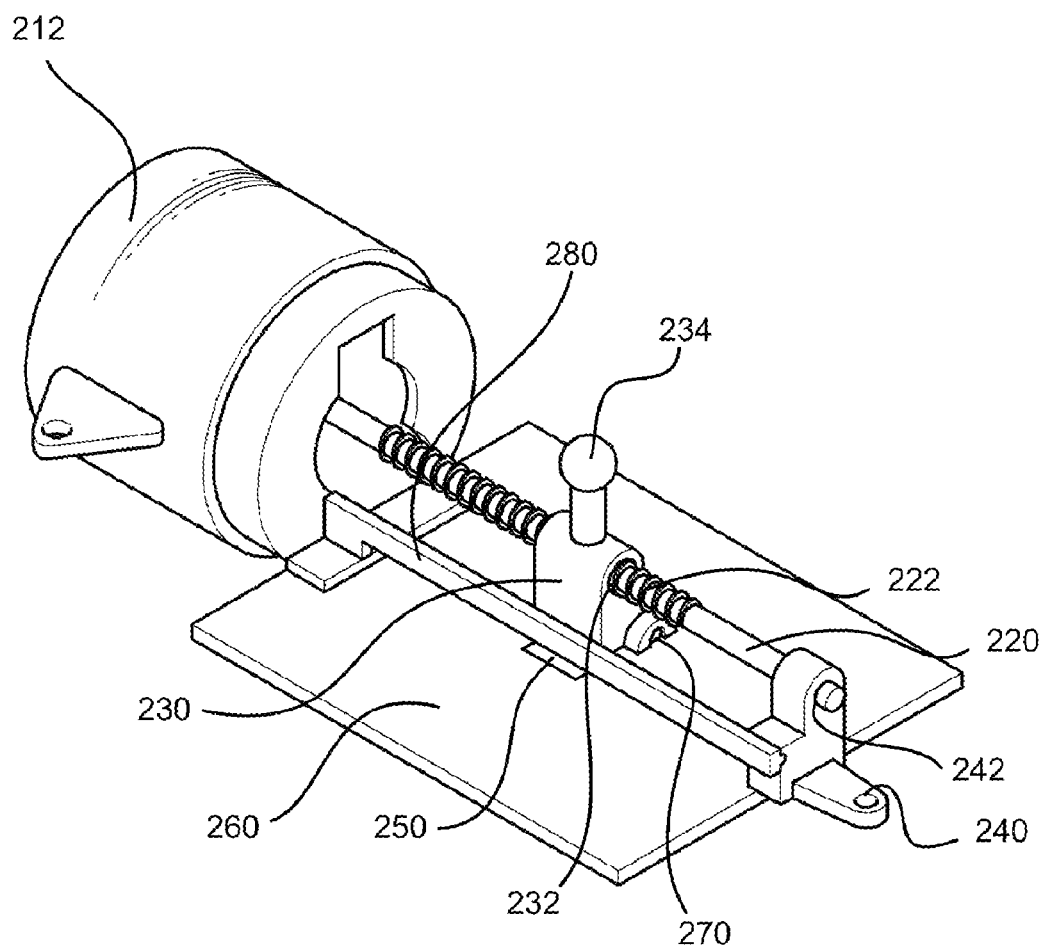
FIG. 6 illustrates a perspective view of an apparatus for rotating a lamp set according to a third exemplary embodiment of the present invention.
Figure 7:
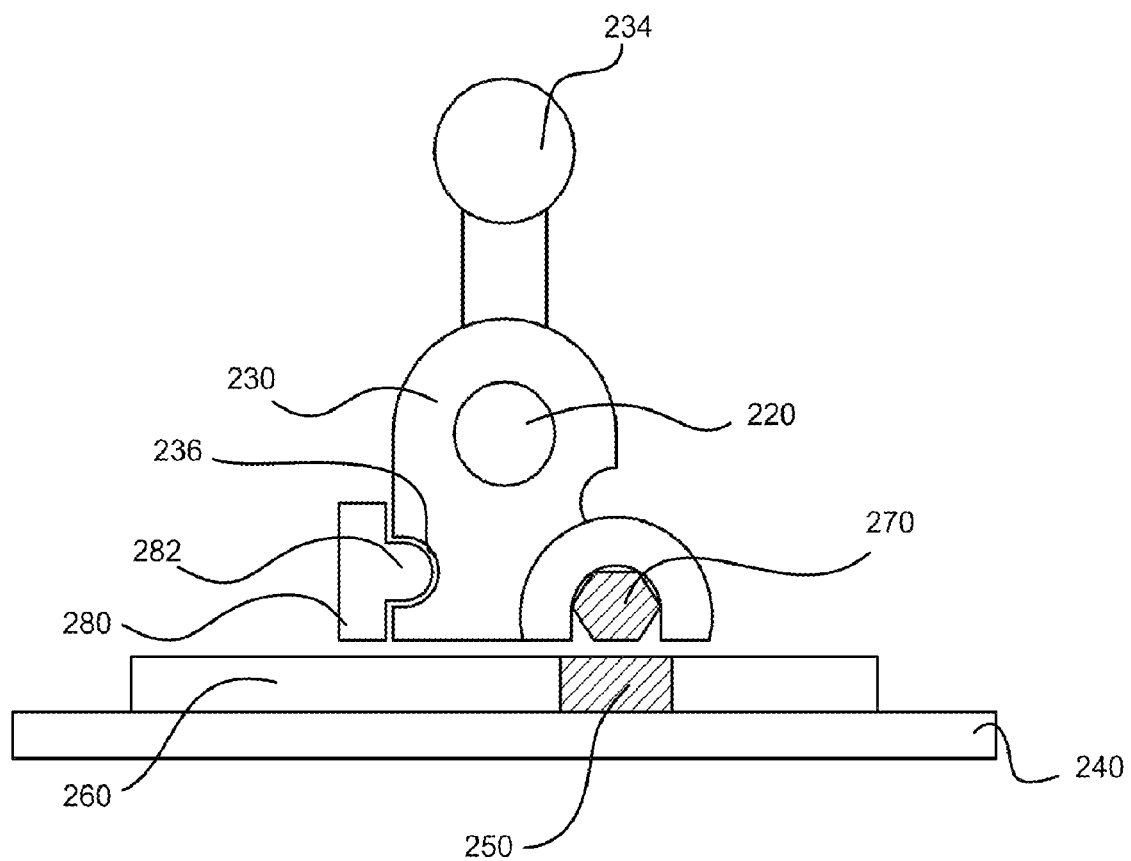
FIG. 7 illustrates a cross-sectional view of the sliding unit of the apparatus shown in FIG. 6.

FIG. 6 illustrates a perspective view of an apparatus for rotating a lamp set according to a third exemplary embodiment of the present invention, and FIG. 7 illustrates a cross-sectional view of the sliding unit 230 of the apparatus shown in FIG. 6.

The exemplary embodiment of FIGS. 4 and 5 will hereinafter be described, mainly focusing on differences from the exemplary embodiment of FIGS. 2 and 3.

The apparatus according to the exemplary embodiment of FIGS. 6 and 7, unlike the apparatus according to the exemplary embodiment of FIGS. 2 and 3, may include a guide unit 280. In addition, the shape of the sliding unit 230 of the apparatus according to the exemplary embodiment of FIGS. 6 and 7 is different from the shape of the sliding unit 230 of the apparatus according to the exemplary embodiment of FIGS. 2 and 3.

Referring to FIGS. 6 and 7, the guide unit 280 is disposed on one side of the path of movement of the sliding unit 230. More specifically, the guide unit 280 may extend from a motor case 212, which covers a motor (not shown), to a frame unit 240 in parallel with a shaft 220. In the exemplary embodiment of FIGS. 6 and 7, unlike in the exemplary embodiment of FIGS. 4 and 5, the guide unit 280 is provided on only one side of the shaft 220. The guide unit 280 may be formed in a single body with the motor case 212 and the frame unit 240, as illustrated in FIG. 6, or formed separately. Referring to FIG. 7, the guide unit 280 may include a protrusion 282, which is formed on an inner lateral surface of the guide unit 280 and faces the sliding unit 230.

The sliding unit 230 may include a groove 236, which is formed on a lateral surface of the sliding unit 230 and faces the guide unit 280. The protrusion 282 of the guide unit 280 may be inserted into the groove 236 of the sliding unit 230. Thus, the movement of the sliding unit 230 may be guided by the guide unit 280, and the sliding unit 320 may be prevented from rotating about the shaft 220 due to the friction between the sliding unit 230 and the shaft 220.

Since the groove 236 is be provided on only one side of the sliding unit 230, a space for fixing a magnet 270 is provided on the other side of the sliding unit 230. Thus, the magnet 270 may be fixed to the other side of the sliding unit 230, as illustrated in FIG. 7. In the exemplary embodiment of FIGS. 4 and 5, a magnet 270 is fixed to the center of the bottom of the sliding unit 230 due to the grooves 236 on either side of the sliding unit 230. On the other hand, in the exemplary embodiment of FIGS. 6 and 7, the groove 236 is provided on only one side of the sliding unit 230, and the magnet 270 is fixed to the other side of the sliding unit 230. Accordingly, since, in the exemplary embodiment of FIGS. 6 and 7, the sliding unit 230 does not need to be tall enough to provide a space for accommodating the magnet 270 below the groove 236, the height of the sliding unit 230 shown in FIGS. 6 and 7 may be less than the height of the sliding unit 230 shown in FIGS. 4 and 5. Referring to FIG. 7, a magnetic sensor 250 may be disposed directly below the magnet 270.

Alternatively, the guide unit 280 may include a groove, instead of a protrusion, and the sliding unit 230 may include a protrusion, instead of a groove. In this case, the protrusion of the sliding unit 230 may be inserted into the groove of the guide unit 280.

Figure 8:
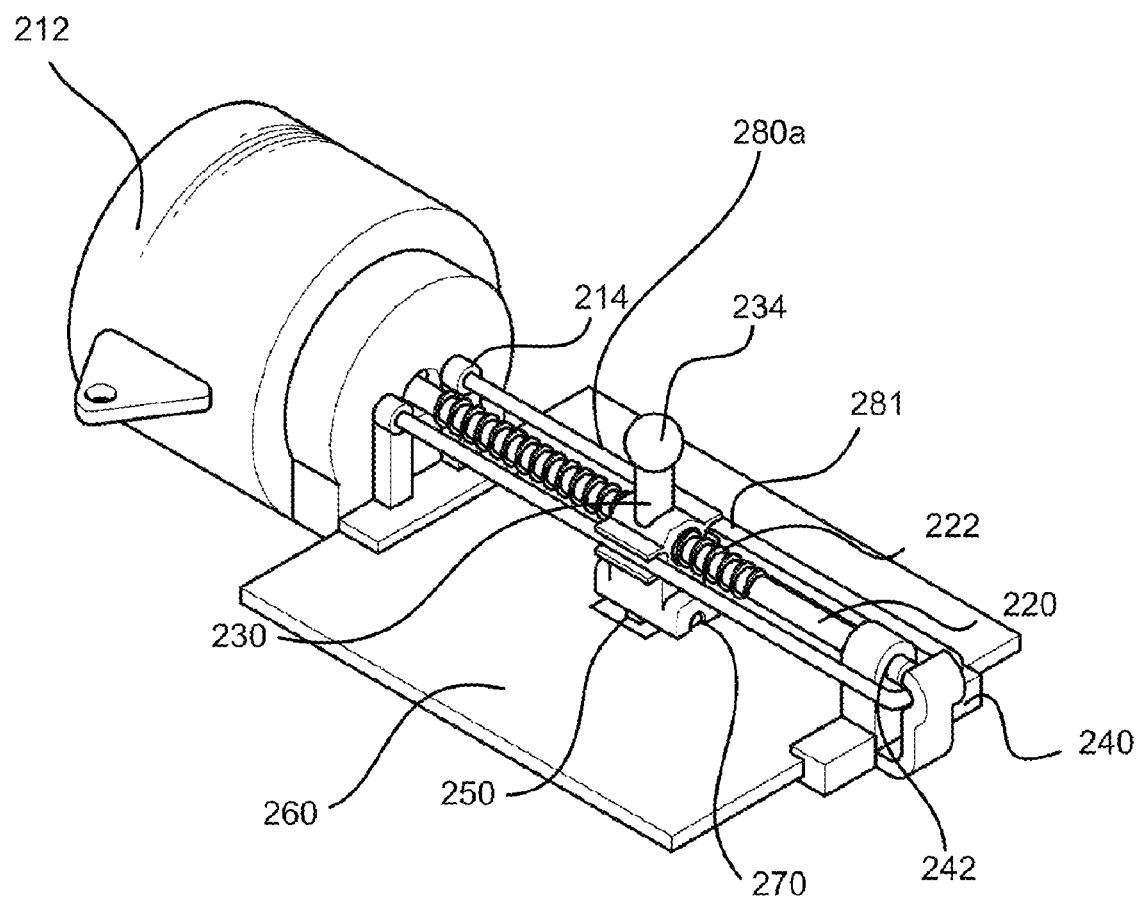
FIG. 8 illustrates a perspective view of an apparatus for rotating a lamp set according to a fourth exemplary embodiment of the present invention.
Figure 9:
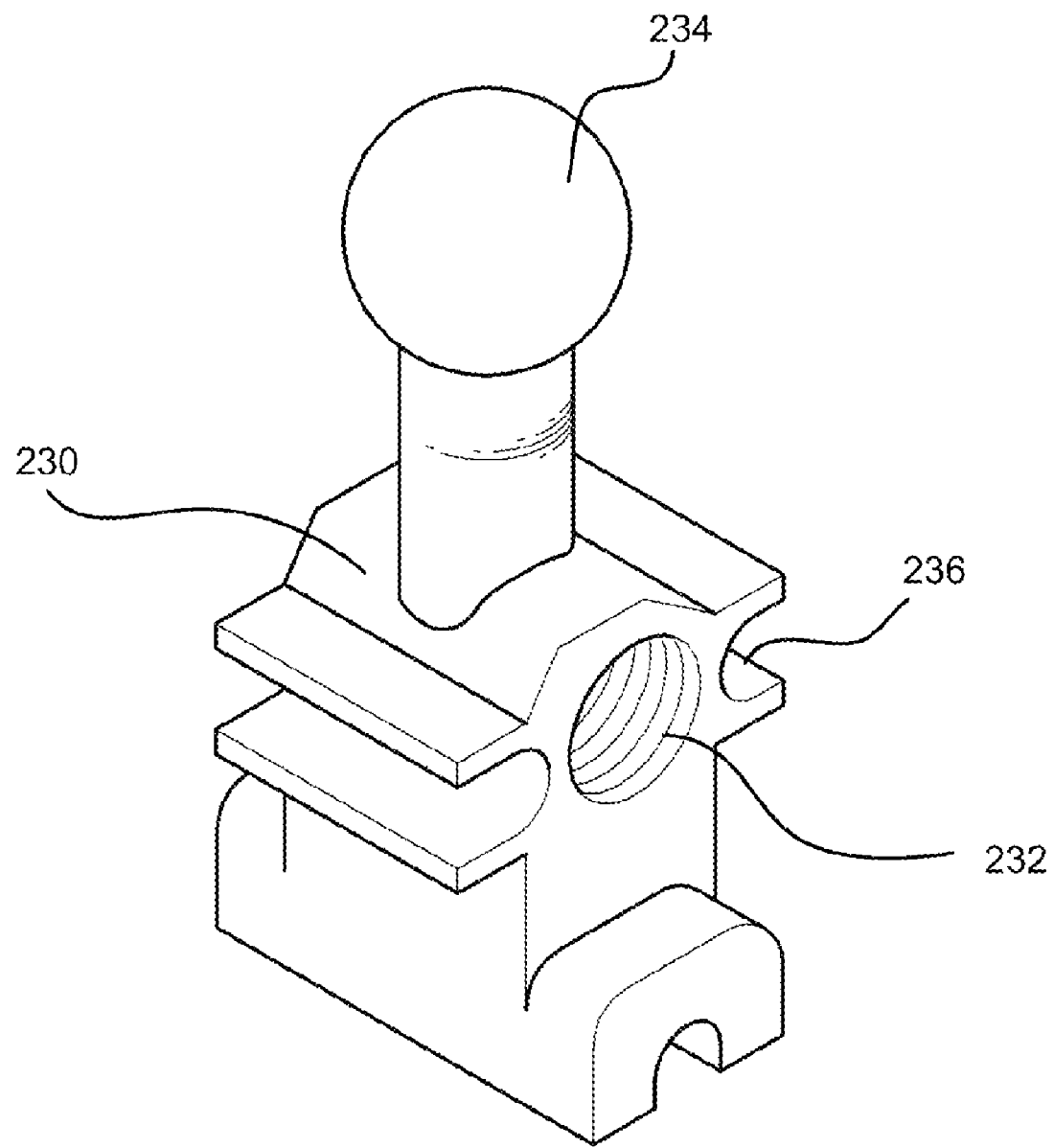
FIG. 9 illustrates a perspective view of the sliding unit of the apparatus shown in FIG. 8.
Figure 10:
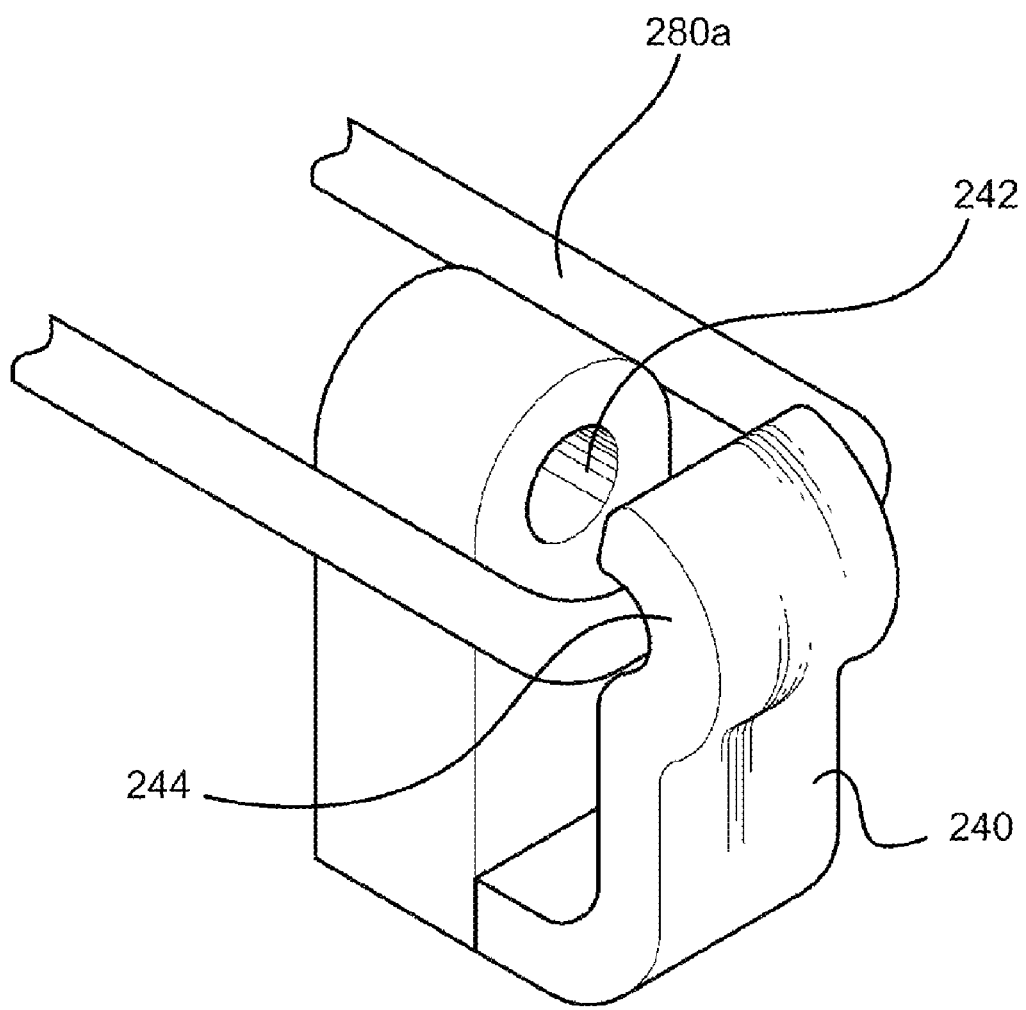
FIG. 10 illustrates a perspective view showing how to fix the U-shaped pipe of the apparatus shown in FIG. 8.

FIG. 8 illustrates a perspective view of an apparatus for rotating a lamp set according to a fourth exemplary embodiment of the present invention, FIG. 9 illustrates a perspective view of the sliding unit 230 of the apparatus shown in FIG. 8, and FIG. 10 illustrates a perspective view showing how to fix the U-shaped pipe 280a of the apparatus shown in FIG. 8.

The exemplary embodiment of FIGS. 8 through 10 will hereinafter be described, mainly focusing on differences from the exemplary embodiment of FIGS. 2 and 3.

The apparatus according to the exemplary embodiment of FIGS. 8 through 10, unlike the apparatus according to the exemplary embodiment of FIGS. 2 and 3, may include a guide unit, i.e., the U-shaped pipe 280a. In addition, the shape of the sliding unit 230 of the apparatus according to the exemplary embodiment of FIGS. 8 through 10 is different from the shape of the sliding unit 230 of the apparatus according to the exemplary embodiment of FIGS. 2 and 3.

Referring to FIG. 8, the U-shaped pipe 280a may have various types of cross-section. For instance it may have a circular cross-section. The U-shaped pipe 280a may be fixed so as to surround a shaft 220. A curved portion of the U-shaped pipe 280a may be inserted into a groove 244 of a frame unit 240 and may thus be supported by the frame unit 240, as illustrated in FIG. 10. Thus, the U-shaped pipe 280a may be prevented from hanging down and may be fixed. Preferably, the U-shaped pipe 280a is formed separately from a motor case 212. In this case, the U-shaped pipe 280 may be fixed to the motor case 212 by inserting two end portions of the U-shaped pipes 280a in a pair of holes 214 of the motor case 212. The motor case 212 may be formed in a single body with the frame unit 240, as shown in FIG. 8, or formed separately (e.g., they can be detachable).

Referring to FIG. 9, the sliding unit 230 may include a pair of grooves 236, which are formed on either lateral surfaces of the sliding unit 230, and thus, the U-shaped pipe 280a may be inserted into the sliding unit 230. More specifically, two straight line portions 281 of the U-shaped pipe 280a may be inserted into the grooves 236 of the sliding unit 230. Thus, the movement of the sliding unit 230 may be guided by the U-shaped pipe 280a, and the sliding unit 230 may be prevented from rotating about the shaft 220 due to the friction between the sliding unit 230 and the shaft 220.

Figure 11:
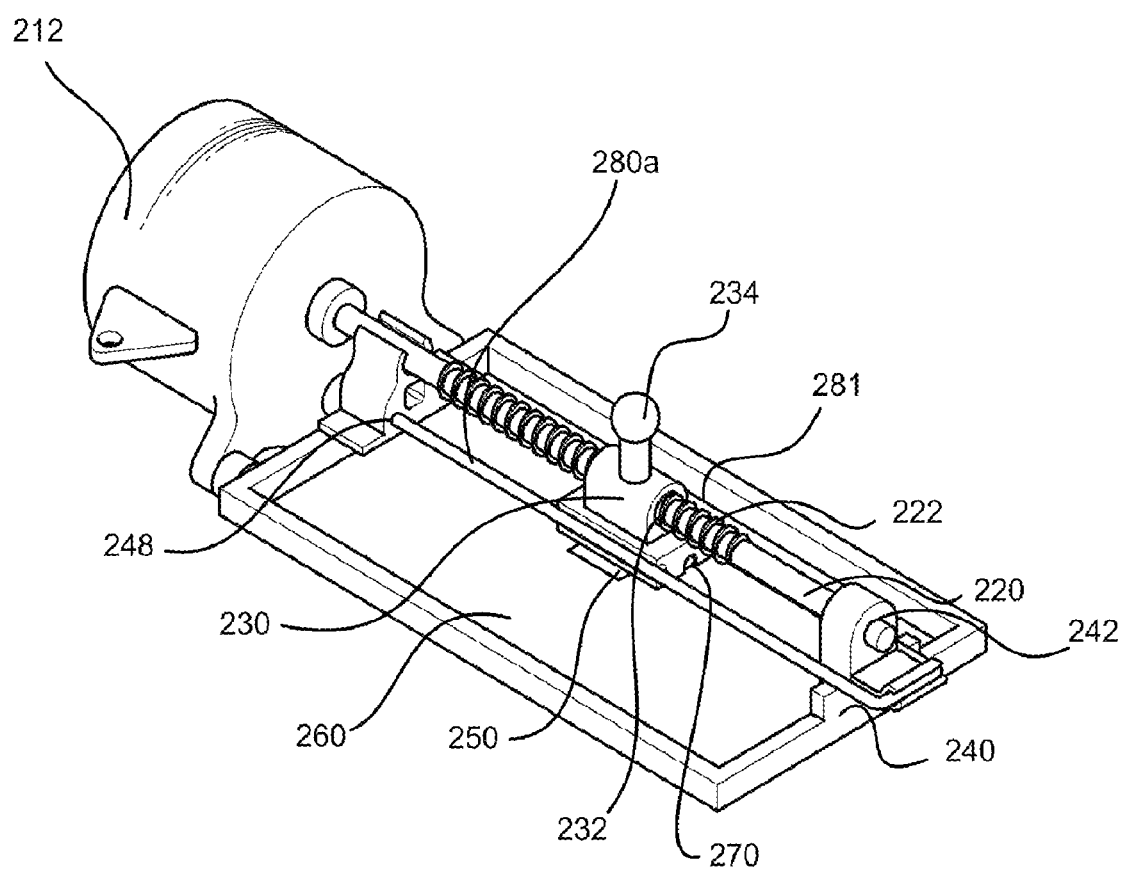
FIG. 11 illustrates a perspective view of an apparatus for rotating a lamp set according to a fifth exemplary embodiment of the present invention.
Figure 12:
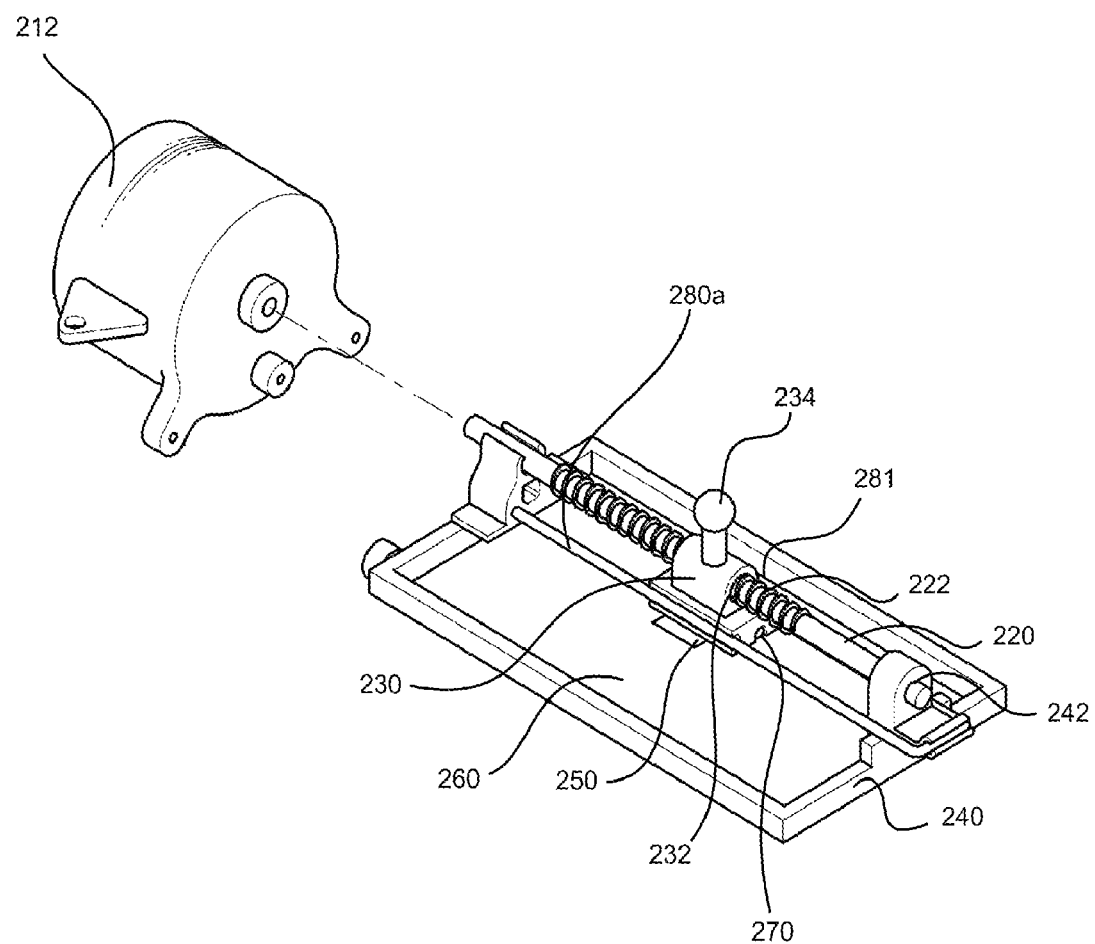
FIG. 12 illustrates a perspective view of the apparatus shown in FIG. 11 when a motor assembly and a frame assembly are detached from each other.

FIG. 11 illustrates a perspective view of an apparatus for rotating a lamp set according to a fifth exemplary embodiment of the present invention, and FIG. 12 illustrates a perspective view of the apparatus shown in FIG. 11 when a motor assembly and a frame assembly are detached from each other.

The exemplary embodiment of FIGS. 11 and 12 is the same as the exemplary embodiment of FIGS. 9 and 10 except that the frame unit 240 can be detached from the motor case 212.

In the exemplary embodiment of FIGS. 9 and 10, the U-shaped pipe 280a may be inserted into the grooves 236 of the sliding unit 230. Thereafter, the U-shaped pipe 280a may be fixed to the motor case 212. Thereafter, a motor (not shown) including the shaft 220 may be inserted into and fixed in the motor case 212, and the end of the shaft 220 may be inserted into the groove or hole 242 of the frame unit 240, thereby completing the assembly of an apparatus for rotating a lamp set.

On the other hand, in the exemplary embodiment of FIGS. 11 and 12, the U-shaped pipe 280a may be inserted into a pair of holes 248 of a frame unit 240 and may thus be fixed to the frame unit 240. Thereafter, a shaft 220, which is yet to be coupled to a motor (not shown), may be fixed to a sliding unit 230 and the frame unit 240. In short, the frame unit 240, the U-shaped pipe 280a, the sliding unit 230 and the shaft 220 may be coupled to one another, thereby assembling a frame assembly. Thereafter, a motor assembly including a motor case 212 and the motor inserted in the motor case 212 may be coupled to the frame assembly, thereby completing the assembly of an apparatus for rotating a lamp set.

As described above, according to the present invention, it is possible to stably improve the visibility of drivers and thus to prevent traffic accidents by automatically changing the direction of a lamp set according to the vehicle driving direction.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for rotating a lamp set, the apparatus comprising:
    a motor;
    a shaft which is rotatable by the motor and includes screw threads formed thereon;
    a sliding unit which includes a hole having screw threads formed therein that are engaged with the screw threads of the shaft and an insertion ball, the sliding unit being movable along the shaft upon rotation of the shaft;
    a holder unit which includes a groove, the insertion ball being inserted into the groove; and
    a frame unit which includes a groove or hole into which an end of the shaft is inserted to fix the end of the shaft, and fixes below the sliding unit a substrate including a magnetic sensor for detecting the position of the sliding unit.

2. The apparatus of claim 1, further comprising a magnet which is fixed onto the bottom of the sliding unit, wherein the magnetic sensor detects the position of the sliding unit by detecting the position of the magnet.

3. The apparatus of claim 1, further comprising at least one guide unit which is disposed along a path of movement of the sliding unit and in contact with the sliding unit so as to prevent the sliding unit from rotating about the shaft and guide the movement of the sliding unit.

4. The apparatus of claim 3, wherein:
the sliding unit further includes a pair of grooves formed on either lateral surfaces of the sliding unit;
a pair of the guide units are provided on either side of the path of movement of the sliding unit and each of the guide units includes a protrusion formed on a surface thereof contacting the sliding unit; and
the sliding unit is guided by the guide units while the protrusions are inserted into the grooves.

5. The apparatus of claim 3, wherein:
the sliding unit further includes a pair of protrusions formed on either lateral surfaces of the sliding unit;
a pair of the guide units are provided on either side of the path of movement of the sliding unit and each of the guide units includes a groove formed on a surface thereof contacting the sliding unit; and
the sliding unit is guided by the guide units while the protrusions are inserted into the grooves.

6. The apparatus of claim 3, wherein:
the sliding unit further includes a groove formed on a lateral surface of the sliding unit;
the guide unit is provided on one side of the path of movement of the sliding unit and includes a protrusion formed on a surface thereof contacting the sliding unit; and
the sliding unit is guided by the guide unit while the protrusion is inserted into the groove.

7. The apparatus of claim 3, wherein:
the sliding unit further includes a protrusion formed on a lateral surface of the sliding unit;
the guide unit is provided on one side of the path of movement of the sliding unit and includes a groove formed on a surface thereof contacting the sliding unit; and
the sliding unit is guided by the guide unit while the protrusion is inserted into the groove.

8. The apparatus of claim 3, wherein:
the sliding unit further includes a pair of grooves formed on either lateral surfaces of the sliding unit;
the guide unit is formed as a U-shaped pipe;
the sliding unit is guided by the guide unit while two straight line portions of the U-shaped pipe are inserted into the grooves.

* * * * *